INVENTORS
SIGVARD J. STENLUND
ALFRED J. WENDT
JOHN A. MacFADDEN

BY

ATTORNEYS

April 28, 1970

JAMES E. WEBB  3,508,999
ADMINISTRATOR OF THE NATIONAL AERONAUTICS
AND SPACE ADMINISTRATION
ROTATING MANDREL FOR ASSEMBLY OF INFLATABLE DEVICES

Filed March 31, 1967  4 Sheets-Sheet 4

INVENTORS
SIGVARD J. STENLUND
ALFRED J. WENDT
JOHN A. MacFADDEN

BY

ATTORNEYS

United States Patent Office 3,508,999
Patented Apr. 28, 1970

3,508,999
ROTATING MANDREL FOR ASSEMBLY OF INFLATABLE DEVICES
James E. Webb, Administrator of the National Aeronautics and Space Administration with respect to an invention of Sigvard J. Stenlund, Northfield, Alfred J. Wendt, Minneapolis, and John A. MacFadden, Farmington, Minn.
Filed Mar. 31, 1967, Ser. No. 628,246
Int. Cl. B32b 31/04, 31/10; B65b 9/06
U.S. Cl. 156—510                                    10 Claims

ABSTRACT OF THE DISCLOSURE

Apparatus facilitating the accurate measurement, cutting and assembling of an adequate number of gores from sheet stock material to form an inflatable structure with a configuration of a solid of revolution.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates generally to apparatus for facilitating the accurate measurement, cutting and assembling of an integral number of gores, from lightweight sheet stock material, to form an inflatable structure with a configuration of a solid of revolution, and relates in particular to a rotatable, elongated, multisided mandrel structure utilized to simplify, mechanize, and speed up the inflatable fabrication as well as to reduce inaccuracies and material damage during assembly of lightweight sheet stock into inflatable structures.

The use of large inflatable structures for experiments in outer space is becoming increasingly important. Such inflatable structures offer numerous possibilities for use in communications relay station, wheather forecasting fields, television communication and other studies relating to outer space. The structures normally employed for these uses are constructed of flexible and lightweight metallic coated plastics of less than one thousandths of an inch thickness which is assembled into a unitary structure and carried aloft in a compact package and, at preselected distance from earth, erected to assume a particular configuration. Obviously, when dealing with materials of less than one thousandths of an inch thickness, such as the aluminum-Mylar laminate employed for the Echo balloons, the fabrication of the unitary inflatable structure presents many problems and requires numerous manhours in the assembly thereof.

Heretofore, the assembly of these large inflatable structures involved several independent steps including (1) assembly of a pattern for defining individual sections of the device, (2) layout of material over the pattern, (3) cutting the material to the pattern shape, (4) stamping of match marks along the edge of the material, (5) rolling up the cut pieces for storage until used, (6) setup and mating of match marks for adjacent sections on a sealing rail, (7) sealing, and (8) removal of the sealed sections from the rail. into the final assembled configuration. The disadvantages of these numerous process steps required to final assembly are obvious inasmuch as the material must be handled excessively, and all operations except the sealing step are manual. In addition, tolerance buildup occurs because each operation has a tolerance associated with it and many trained technicians are required because of the manual operations. Also due to the manual handling and numerous steps in this prior art fabrication technique, the scrap rates of the stock material have proved quite high and surface irregularities have occurred on the final configurations because it is not always possible to mate adjacent match marks.

Thus, there is a definite need in the art for a fabrication technique that eliminates or minimizes the numerous manual operation steps required in the production of large lightweight inflatable structures.

Accordingly, it is an object of the present invention to provide an apparatus that will simplify, mechanize, and speed up inflatable fabrication as well as to reduce inaccuracies and material damage during assembly of inflatable structures.

Another object of the present invention is a novel rotatable mandrel assembly whereby individual gores required to form an inflatable structure with a configuration of a solid of revolution may be measured, cut and sealed in a continuous operation.

Another object of the present invention is an apparatus for fabricating inflatable structures serving to reduce the scrap rate of stock material employed in making up the inflatable structure.

Another object of the present invention is an apparatus for assembling inflatable structures wherein the handling of the stock material is minimized.

Another object of the present invention is an apparatus for speeding up the fabrication of inflatable structures from sheet stock material.

According to the present invention, the foregoing and other objects are attained by providing a rotatable, elongated, multisided mandrel structure which, in cross section, is equivalent to an integral number of gores for fabrication of an inflatable structure of predetermined configuration. Each of the mandrel sides are of substantially the same size and shape and, in planform, represent a pattern for an individual gore for the inflatable structure. The rotatable mandrel of the present invention is maintained, by a suitable support structure, in suspended, rotative position. A horizontal track is vertically spaced from the mandrel and also supported by the support structure. A motorized sealing unit is movable along the horizontal track and serves to sealingly connect adjacent gores while they are disposed on the mandrel after having been cut from the sheet stock material.

The rotatable mandrel skeletal structure is formed of a plurality of elongated rib members with the area between the adjacent rib members defining the peripheral shape for an individual gore used to make up the final inflatable configuration. Each of the rib members is provided with a central slot throughout the length thereof which serves as a cutting and sealing guide during the cutting and sealing of the individual gores into a unitary structure.

The specific dimensions for the mandrel structure will vary with the specific inflatable structure to be fabricated. The mandrel circumference, in cross section, is everywhere equivalent to an integral number of gores; a gore being defined as the cut materials used as sections for assembly of the inflatable. In the case of a spherical inflatable structure, a gore is defined by the surface area between two great circles that converge at two points, the two points being 180° apart. The periphery of each gore is measured on the mandrel by the two slots appearing in adjacent ribs of the mandrel skeletal structure with the slots serving as a cutting and sealing guide. Since the mandrel cross section is equivalent to an integral number of gores, material can be cut and sealed continuously until the required number are fastened together for completion of the device.

A more complete appreciation of the invention and many of the attendant advantages thereof will be readily apparent as the same becomes better understood by reference to the following detailed description when con-

3 sidered in connection with the accompanying drawings wherein:

FIG. 5 is a view of a single gore of material as measured and formed on the mandrel shown in FIG. 2.

Figure 1:
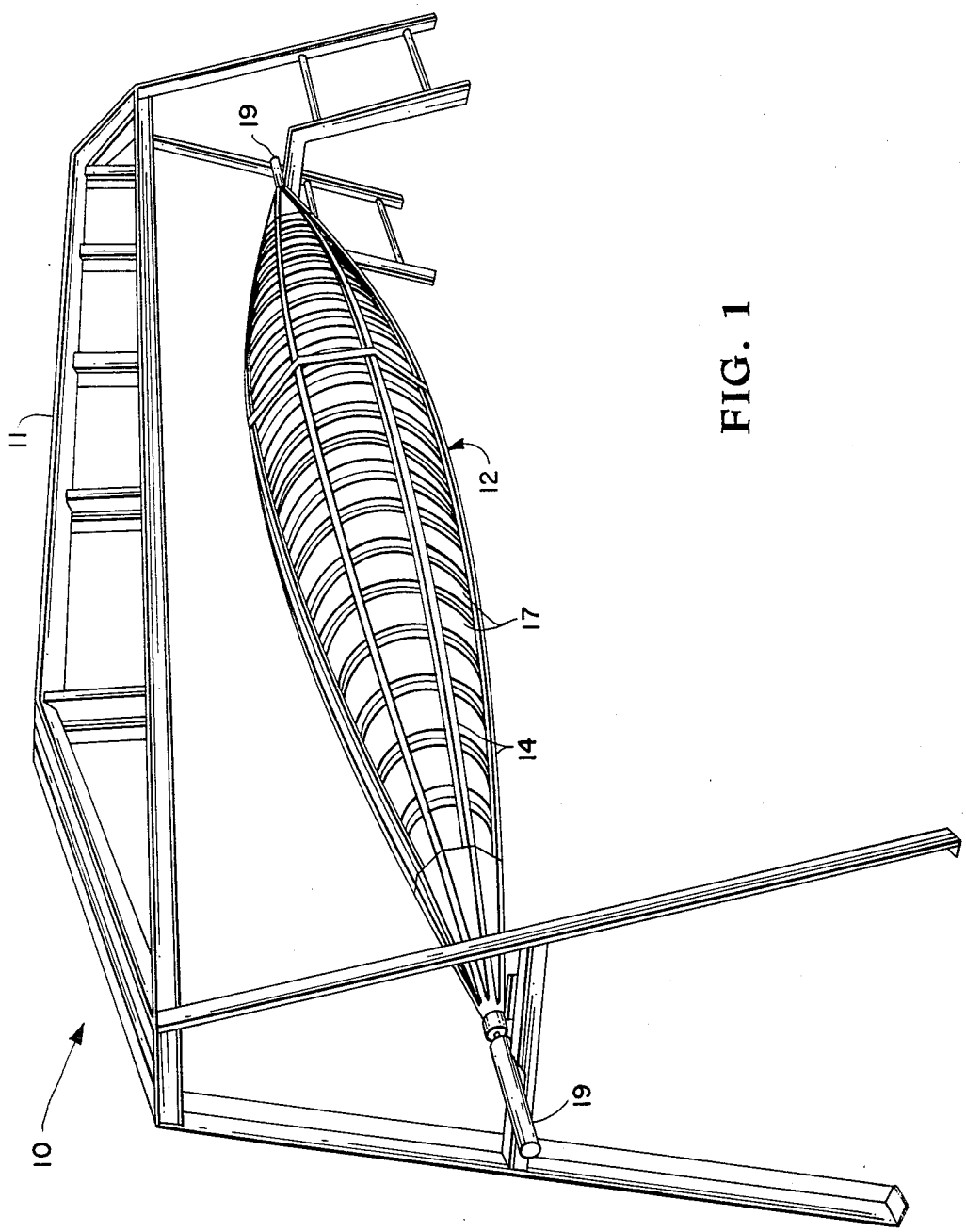
FIG. 1 is a view of a mandrel skeletal structure suspended on the support structure according to the present invention.

Referring more particularly to the drawings, wherein like reference numerals designate identical parts throughout the several views, and more particularly to FIG. 1, there is shown the inflatable assembly apparatus generally designated by reference numeral 10 and employing support structure 11 and rotatable mandrel structure generally designated by reference numeral 12. The skeletal structure of mandrel 12 as shown in FIG. 1 includes a plurality of identical elongated rib members with a plurality of circular bulkhead supports 17 maintaining the rib members 14 in fixed predetermined interconnection. The various bulkheads 17 are of identical construction except for circumferential area variations. The specific configuration for the mandrel 12 is determined mathematically so as to provide a multisided structure wherein the cross section thereof will be equivalent to an integral number of gores for fabrication of an inflatable structure of predetermined configuration with each of the mandrel sides being of substantially the same size and shape and, in planform, representing a pattern for an individual gore for the inflatable structure. The pattern for an individual gore on the mandrel is thus determined by the space defined between any two adjacent rib members 14. An axle 19 extends from each end of mandrel 12 and provides the rotative support for mandrel 13 on the support structure 11. Mandrel 12 may be rotated on its axle 19 by a suitable motor, not shown or manually as so desired.

A horizontal track 21 forms an integral part of the support structure 11 and is vertically spaced from mandrel 12.

Figure 2:
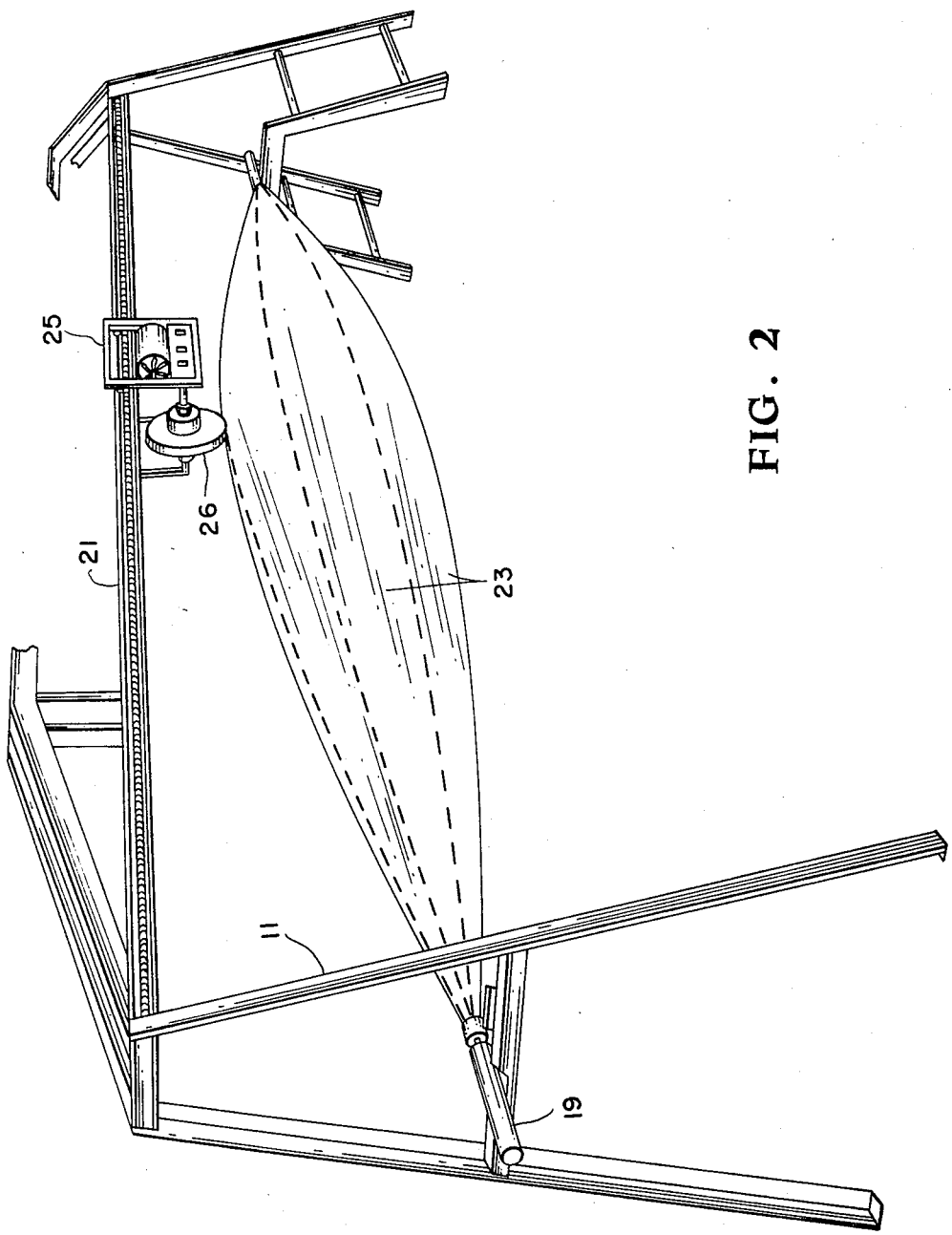
FIG. 2 is a view of the mandrel and support structure in final operative form and in position to receive sheet stock material.

Referring now more particularly to FIG. 2, the final configuration of the mandrel 12 in operative position for receiving sheet stock is shown. As shown therein, the exterior of mandrel 12 is esseentially covered by a plurality of suitable fabric cover sections 23 when utilizing the skeletal structure shown in FIG. 1 for measuring, cutting and sealing sheet stock material to form inflatable structures, as will be more fully explained hereinafter.

A motorized sealing unit 25, movable along and supported by horizontal track 21, serves to seal the individual gores of the inflatable structure after they have been measured and cut on mandrel 12. Sealing unit 25 utilizes a hot wheel and sealing tape to effect joining of the adjacent panels, in a conventional manner. A similar sealing unit of this type is more fully explained in U.S. patent application Ser. No. 499,122, filed Oct. 20, 1965, now Patent No. 3,416,988 for a "Traveling Sealer for Contoured Table" and assigned to the National Aeronautics and Space Administration. Inasmuch as mandrel 12 is provided with some slope, a maximum of 12°, sealing unit 25 is also adapted for slight vertical movement as it moves horizontally along track 21 so as to minimize pressure variations.

In the normal sealing of the Mylar-aluminum laminate material generally used for construction of inflatable satellite structures, a sealing temperature of 340° F. is employed by sealing unit 25, with the required pressure applied to effect the sealing being sixty to one hundred p.s.i.

Figure 3:
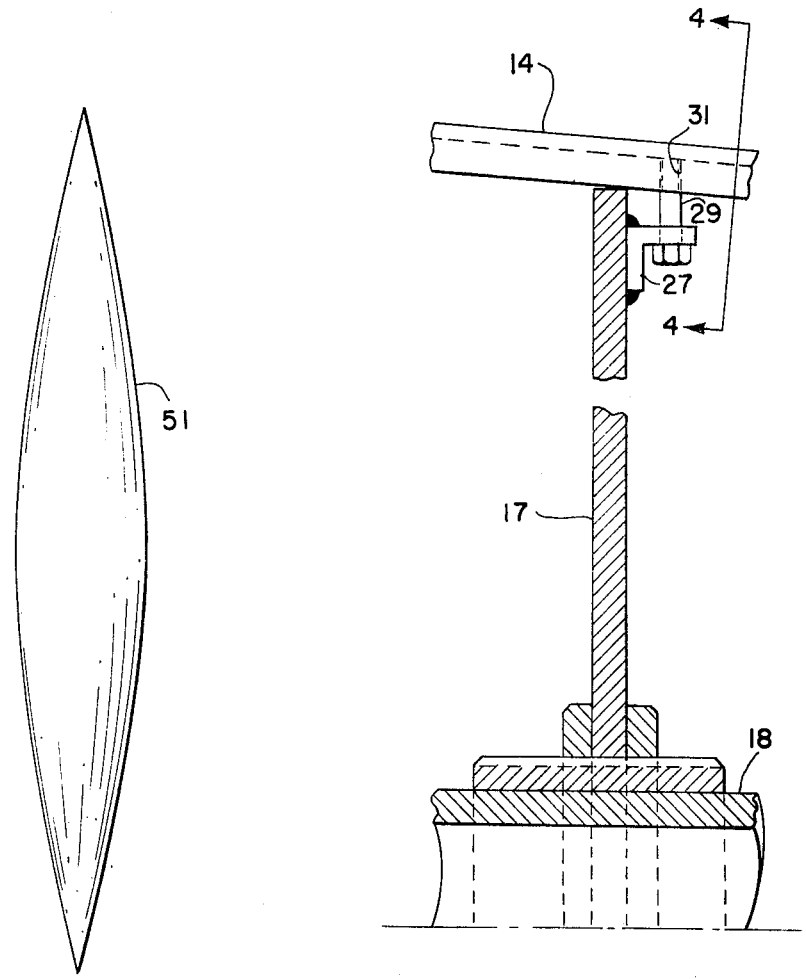
FIG. 3 is a part-sectional view of one of the circular bulkheads and the supporting rib member making up the skeletal structure of the mandrel of the present invention.

Referring now more particulary to FIG. 3, the individual circular bulkheads, one of which is shown in section and is designated by reference numeral 17, serve to support the rib members, as described hereinbefore and as represented by rib member 14 in this figure. As shown in FIG. 3, circular bulkhead 17 includes a plurality of integral brackets adjacent the periphery thereof one of which is in FIG. 3 and designated by reference numeral 27. Brackets 27 are equal in number to the number of ribs 14 making up the skeletal structure of the rotatable mandrel 12 but only one of which is shown in the interest of simplicity. Bracket 27 secures rib 14 in integral connection with bulkhead 17 by way of bolt 29 through a suitable tapped opening 31 provided in the base of rib 14. The center of each bulkhead 17 is bored to receive a conduit 18 therethrough for connection with axle 19 in a conventional manner.

Figure 4:
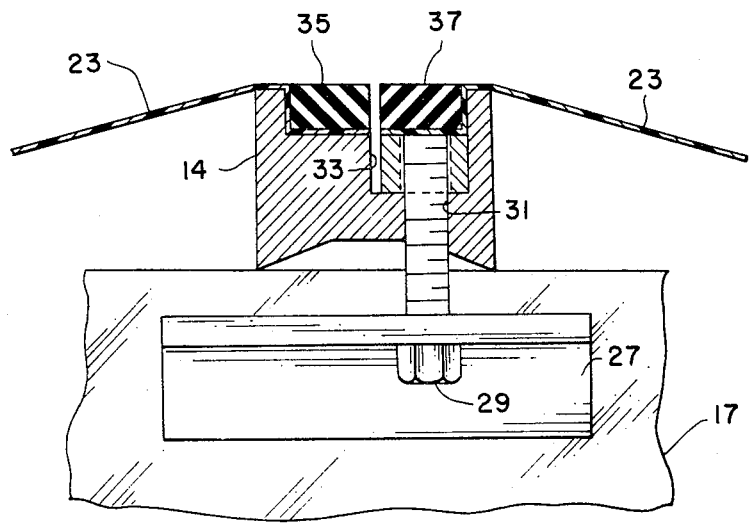
FIG. 4 is an enlarged sectional view of the rib member shown in FIG. 3 as taken along lines 4—4 of FIG. 3.

As shown more particularly in FIG. 4, rib 14, in section, shows the longitudinally extended slot 33 therein. Slot 33 is bounded on each side by a longitudinally extending strip of rubber as designated by reference numerals 35 and 37. Rubber strips 35 and 37 perform the dual function of maintaining the fabric sections 23 in position on mandrel 12 and by defining the width of slot 33 to thereby provide a positive groove surface within the ribs 14. The exposed surface of rubber strips 35 and 37 provide a tacky surface for assisting in fixedly positioning sheet stock material on the mandrel.

Rubber strips 35 and 37 are bonded by a suitable adhesive into position so as to expose slot 33 therebetween with the exterior surface of the rubber strips being tacky and flush with the exterior rib surfaces. Fabric covering 23 for mandrel 12 is formed of a plurality of sections of suitable fabric, such for example a Dacron-Mylar laminate, which are also maintained in position by being placed beneath rubber strips 35 and 37 on each of the receptive ribs and bonded into position therewith. The area of fabric sections 23 in contact with rubber strips 35 and 37 is provided with suitable perforations to insure a good adhesive bond being obtained by the rubber strips.

Aluminum, or any other lightweight metallic material, may be employed for the construction of ribs 14, as well as for the circular bulkheads 17. It is to be understood that the general construction of the other bulkheads and ribs making up mandrel 12 are essentially identical to that for bulkhead 17 and rib 14 illustrated in FIG. 4 but the details of the others have been omitted in the interest of clarity.

An individual gore measured and cut according to the present invention is illustrated in FIG. 5 and designated by reference numeral 51.

Figure 6:
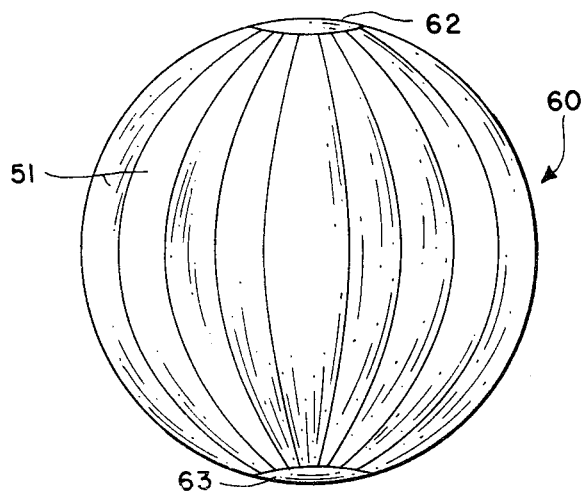
FIG. 6 is a view of a final inflatable configuration constructed in accordance with the present invention.

The inflatable structure shown in FIG. 6, and generally designated by reference numeral 60, is constructed from a plurality of gores 51 with a pair of end caps 62 and 63 being added thereto over the ends of the individual connected gores 51 in a conventional manner. Inflatable structures of this type may be fabricated in accordance with the present invention of from a few feet in diameter to more than a hundred feet in diameter with the maximum size being restricted essentially only to the maximum length mandrel that can be constructed.

OPERATION

The operation of the above described invention is now believed apparent. Sheet stock is received from the manufacturer in correct width rolls for fabrication of the inflatable structures. A roll of this stock material, not shown, is disposed in position to permit the material to be laid up on the mandrel 12 over the defined mandrel gore section to provide contact with the tacky surface of the rubber strips 35 and 37 on two adjacent rib members. This area between adjacent ribs provides a pattern for a specific gore. This pattern is stretched sufficiently to eliminate wrinkles in the material and then fastened in place by a suitable pressure-sensitive tape placed along the periphery thereof. The measured material is then cut to gore shape by utilizing slots 33 in the adjacent rib members as a cutting guide. The apparatus for cutting the individual gore patterns may be hand-operated or may be a motorized blade adapted to move across the mandrel length and supported by the horizontal track 21 or the like structure, as so desired.

After cutting of a first gore panel to the shape of the one side of the mandrel surface, the mandrel is rotated and more material placed in position and cut to shape a second gore on an adjacent side surface of the mandrel. After two adjacent panels are in place and cut to shape a seal is made along the adjacent surfaces thereof by motorized sealing unit 25. Sealing unit 25, as mentioned hereinbefore, may be of conventional structure normally used in a sealing inflatable structure of this type with the only modification thereof being a suitable guide wheel 26 or the like being employed to follow guide slot 33 in the rib structures so as to maintain the seal formed in an essential uniform fashion.

After connecting two adjacent panels, mandrel 12 is rotated to bring a third side thereof into position for measuring, cutting and sealing of a third gore to the second gore. This operation is continued in like manner until the entire structure for the inflatable device is completed with new material being added to one side and sealed material removed at the opposite side of the mandrel. A suitable bag or other container, not shown, may be disposed on the back side of mandrel support 11 so as to receive and store the sealed material until all gores are cut and sealed. This continuous gored structure is then removed and the first and last gores connected together in a conventional manner with polar end caps 61 and 62 being added to the gore ends so as to provide the completed inflatable structure as shown in FIGURE 6.

Although the invention has been described with a specific number of gores, eight, being shown for mandrel 12, it is to be understood that the basic concept is suitable for assembly of any surface of revolution of any dimension. Thus, the number of gores, the mandrel cross section and length can be varied to suit the required inflatable design. It is thus seen that by the use of the present invention, several of the manual assembly operations normally experienced in the fabrication of large inflatable structures have been eliminated. That is, no separate pattern, separate gore cutting, match marks, storage, layup on a sealing rail, or mating of match marks is required. In addition, the tolerance buildup is limited to the errors built into the mandrel; therefore, an accumulation of the errors cannot occur. The rotating mandrel of the present invention thus provides automation to what has been essentially a manual assembly procedure.

Although the invention has been described and illustrated in reference to a specific configuration for the mandrel and the inflatable structure obtained, it is to be understood that suitable mathematical calculations will permit the use of the rotatable mandrel structure of the present invention for any surface of revolution.

The inflatable structure constructed by use of the specific rotating mandrel described resulted in a 12-foot diameter inflatable balloon with 48 gores being employed in the final inflatable configuration. Any multiple of the sides of the mandrel structure may be employed as the gores in a final configuration and the eight-sided mandrel shown could be employed for making final configurations having any number of gores desired. Thus, for a balloon having twenty gores, two and one-half revolutions of mandrel 12 would be required; for a configuration of fifty gores, six and one-fourth revolutions would be required, etc.

The only quantitative elements needed for designing a specific mandrel are the gore width at all points along the longitudinal gore centerline, the distance between gore stations measured along the gore centerline and the number of gores that the mandrel is to have, this being eight in the presently illustrated embodiment.

Although the invention has been described more specifically relating to the use of thin aluminum-Mylar laminate material for constructing inflatable communications satellites and the like, it is to be understood that the invention is not limited thereto. More specifically, the rotating mandrel assembly of the present invention may be utilized in the fabrication of any gored material regardless of the thickness thereof when it is necessary or desirable that an automated assembly procedure be employed for constructing a structure utilizing a plurality of gored sections.

Also, although a specific material has been mentioned for mandrel cover sections 23, it is to be understood that this is illustrative only and the invention is not to be limited thereto. Thus, any suitable material forming a membrane between the individual ribs to serve as a support for and prevent the stock material from falling into the skeletal structure may be employed for sections 23.

In view of the numerous modifications and variations that will be readily apparent to those skilled in the art in the light of the above teachings, it is to be understood that, within the scope of the appended claims, the invention described herein may be practiced otherwise than as specifically claimed therein.

What is claimed as new and desired to be secured by Letters Patent of the United States is:

1. Apparatus facilitating the accurate measurement, cutting and assembling of an integral number of gores, from sheet stock material, to form an inflatable structure with a configuration of a solid of revolution, comprising:
   (1) a rotatable, elongated, multisided mandrel structure, said structure, in cross-section, being equivalent to an integral number of gores for fabrication of an inflatable structure of predetermined configuration, each of said mandrel sides being
      (a) of substantially the same size and shape
      (b) and, in planform, representing a pattern for an individual gore for said inflatable structure,
   (2) cutting guide means extending substantially along the periphery of each of said mandrel sides,
   (3) axle means extending from each end of said mandrel structure,
   (4) support means for said mandrel structure rotatably receiving said mandrel structure in suspended rotative position,
   (5) horizontal track means vertically spaced from said mandrel and supported by said support means, and
   (6) sealing means movable along said horizontal track serving to sealingly connect adjacent gores after said gores have been cut along the edge of said cutting guide means.

2. The apparatus of claim 1 wherein said mandrel includes a plurality of equi-distance spaced ribs extending the length of said mandrel, and the spacing between individual ribs defining a side surface of said mandrel and each said side surface being essentially in the form of an individual gore for said inflatable structure.

3. The apparatus of claim 2 wherein said mandrel is substantially hollow and a plurality of circular bulkheads are positioned in spaced relationship therein and serving as supports for said ribs.

4. The apparatus of claim 3 wherein each said rib is provided with a slot substantially along the longitudinal midline thereof and disposed on the exterior of said mandrel said slot in each said rib serving as said cutting guide means for an individual gore edge and the slots in two adjacent ribs outlining the periphery of a single gore pattern.

5. The apparatus of claim 4 wherein said sealing means for sealingly connecting said gores includes a guide adapted to traverse said slot as the seal is effected between adjacent gores.

6. The apparatus of claim 4 wherein each said rib is embedded with a pair of longitudinally extending strips of rubber disposed on opposite sides of said slot and serving to provide a tacky surface to assist in maintaining said sheet stock in position on said mandrel during the measuring, cutting and sealing of said gores.

7. The apparatus of claim 6 wherein the exterior of said mandrel surface is substantially covered by a plurality of stretched fabric sections, each of said fabric sections being maintained in position by one of said strips of rubber on adjacent rib members and so constructed and arranged as to maintain the exterior surface of said rubber strips and the slot in each of said ribs exposed along the exterior of said mandrel.

8. The apparatus of claim 6 wherein after a pair of gores have been cut to conform with adjacent sides of said mandrel the sealing means effects sealing engagement of the two gores and said mandrel is rotated to position the sheet material on the adjacent side surface of said mandrel and the cutting of a third gore and the sealing thereof to said second gore is effected with the first of said gores being rotated by said mandrel to be out of the way, said mandrel rotation, sheet measuring, cutting and sealing being repeated until an integral number of said gores have been joined together.

9. Apparatus for accurately measuring, cutting and assembling an integral number of gores to form an inflatable structure with a configuration of a solid of revolution from sheet material, comprising in combination:

mandrel means for receiving sheet material, said mandrel means having a pluarity of faces, each face being of a size and configuration adapted for accurate measurement of a plurality of individual gores of said sheet material to form said inflatable structure, guide means for facilitating cutting of individual gores of said material as measured on said mandrel, and means for sealingly connecting each individual gore to its preceding gore while said gores are on said mandrel.

10. The apparatus of claim 1 wherein said mandrel is provided with eight sides and the inflatable surface of revolution to be formed is made up of any number of sides greater than the number of sides of said mandrel.

References Cited

UNITED STATES PATENTS

| | | | |
|---|---|---|---|
| 2,767,941 | 10/1956 | Gegner et al. | 156—251 X |
| 3,269,884 | 8/1966 | Slater | 156—577 X |
| 3,416,988 | 12/1968 | Dryden et al. | 156—583 X |

BENJAMIN A. BORCHETT, Primary Examiner

J. M. HANLEY, Assistant Examiner

U.S. Cl. X.R.

156—251, 545